United States Patent [19]
Kreuter et al.

[11] Patent Number: 5,588,411
[45] Date of Patent: Dec. 31, 1996

[54] METHOD FOR CONTROLLING AN INTERNAL COMBUSTION ENGINE WITH EXTERNAL IGNITION SYSTEM AND WITH A FUEL INJECTION SYSTEM

[75] Inventors: Peter Kreuter; Peter Heuser, both of Aachen, Germany

[73] Assignee: Meta Motoren- und Energie-Technik GmbH, Herzogenrath, Germany

[21] Appl. No.: 599,435

[22] Filed: Jan. 18, 1996

[30] Foreign Application Priority Data

Jan. 18, 1995 [DE] Germany ........................ 195 01 386.7

[51] Int. Cl.$^6$ ..................................................... F02P 5/00
[52] U.S. Cl. .................. 123/418; 123/90.15; 123/90.17
[58] Field of Search ................................... 123/418, 417, 123/421, 426, 434, 435, 672, 677, 679, 90.15, 90.17, 90.39

[56] References Cited

U.S. PATENT DOCUMENTS

| | | | |
|---|---|---|---|
| 2,814,283 | 4/1955 | Gassmann et al. | 123/90.24 |
| 3,722,484 | 3/1973 | Gordini | 123/90.27 |
| 3,888,216 | 6/1975 | Miokovic | 123/90.15 |
| 4,714,057 | 12/1987 | Wichart | 123/90.15 |
| 4,723,516 | 2/1988 | Slagley et al. | 123/90.16 |
| 5,052,350 | 10/1991 | King | 123/90.16 |
| 5,178,105 | 1/1993 | Norris | 123/90.15 |
| 5,289,805 | 3/1994 | Quinn, Jr. et al. | 123/90.17 |
| 5,469,818 | 11/1995 | Yoshioka et al. | 123/90.15 |
| 5,494,008 | 2/1996 | Ohkawa et al. | 123/90.17 |
| 5,497,737 | 3/1996 | Nakamura | 123/90.15 |

FOREIGN PATENT DOCUMENTS

| | | |
|---|---|---|
| 3835333 | 4/1990 | Germany . |
| 4117675 | 12/1991 | Germany . |
| 4135965 | 5/1992 | Germany . |
| 2180597 | 4/1987 | United Kingdom . |

*Primary Examiner*—Raymond A. Nelli
*Attorney, Agent, or Firm*—Robert W. Becker & Associates

[57] ABSTRACT

In a method for controlling power output of an internal combustion engine with an external ignition system, a fuel injection system is provided for injecting in an injection step fuel into the combustion chamber. At least one inlet valve for each cylinder of the combustion engine is provided for determining the charge input of the combustion chamber during an intake stroke of the internal combustion engine. With a control device a relative phase position between a first and second camshaft operating at identical rpm is set for determining an opening function of the inlet valve. The opening function is defined by the stroke and duration of the open state of the inlet valve. A position of the control device is adjusted according to an accelerator pedal position and operational parameter of the combustion engine. The ignition timing and/or the amount of injected fuel is controlled directly according to the position of the control device and the rpm of the combustion engine.

24 Claims, 5 Drawing Sheets

METHOD FOR CONTROLLING AN INTERNAL COMBUSTION ENGINE WITH EXTERNAL IGNITION SYSTEM AND WITH A FUEL INJECTION SYSTEM

BACKGROUND OF THE INVENTION

The present invention relates to an invention for controlling the power output of an internal combustion engine having an external ignition system and a fuel injection system. According to the method, the position of the accelerator pedal adjusts a control device which controls the opening function of at least one inlet valve that determines the charge during intake of the internal combustion engine, whereby the opening function is defined by valve stroke and duration of the open state of the valve. The control device determines the relative phase position of two camshafts operating normally at identical rpm, and the phase position determines the opening function of the inlet valve.

Internal combustion engines operating according to the aforementioned method, in general, are not provided with a throttle. A charge change is controlled with variable control of the inlet valve(s) as well as, optionally, of the outlet valves. With such a control method the charge change losses can be substantially reduced, and it is also possible to provide for a directed influence on the charge state and the charge composition within the cylinder so that reduced emissions within the untreated exhaust gas are achieved.

Numerous fully variable valve drives for control of the charge of internal combustion engines have been disclosed in the prior art because of the aforementioned advantages; however, in practice, they have not found acceptance yet. In British Patent Application 2 180 597 a valve drive for a reciprocating internal combustion engine is disclosed in which the opening camshaft and the closing camshaft cooperate with a rocker arm that is supported on a valve shaft of inlet valve. In order for the rocker arm to maintain a defined position when the inlet valve is in a closed position, a spring is provided which forces the rocker arm in constant contact to the cam contour of the two cam shafts. Thus, the rocker arm at times is removed from the valve shaft. This considerably complicates use of an automatic valve play compensation system. A further characteristic of the known cam drive is that the actual valve stroke corresponds to half the height of the cam which makes the cam drive bulky and limits it with respect to its rpm consistency. For changing the phase position between the camshafts, they are connected to one another with a coupling gear that comprises for the phase adjustment a coupling, actuated by the accelerator pedal, as a control device. Similarly to a throttle, which is mechanically connected to the accelerator pedal of conventional motors, the coupling takes over the charge control of the internal combustion engine. This results in the problem that the inlet valve must close approximately in the range of the upper dead center of the piston because, otherwise, the filling of the cylinder and thus the torque at low rpm would be disadvantageously affected.

For controlling ignition and injection, it is known to determine the amount of intake air taken in by the engine with a sensor for measuring the volume or mass of the intake air and to control the amount of fuel to be injected as a function of the measured signal. These known control methods have the disadvantage, especially during dynamic operation in which, due to the change of the throttle position or due to a fast rpm change, the pressure within the suction tube changes, that they are relatively imprecise because the measured signal does note provide sufficiently precise clues with regard to the amount of intake air flowing into a respective cylinder and the thus required fuel amount. This results in increased pollutant levels within the exhaust gas, increased fuel consumption, and driving errors.

It is therefore an object of the present invention to provide a method for controlling an internal combustion engine with external ignition system and fuel injection device with which method, for a reduced amount of pollutants within the exhaust gas, an increased torque and increased power output is possible.

SUMMARY OF THE INVENTION

The inventive method for controlling power output of an internal combustion engine with an external ignition system is primarily characterized by the following steps:

providing at least one inlet valve for each cylinder of the combustion engine for determining the amount of charge input of the combustion chamber of the cylinder during an intake stroke of the internal combustion engine;

providing a fuel injection system for injecting in an injection step fuel into the combustion chamber;

setting with the control device a relative phase position between a first and a second camshaft operating at identical rpm for determining an opening function of the inlet valve, the opening function being defined by the stroke and duration of an open state of the inlet valve;

Adjusting a position of the control device according to an accelerator pedal position and at least one operational parameter of the combustion engine; and controlling at least one of the ignition timing and the amount of injected fuel directly according to the position of the control device and the engine rpm of the internal combustion engine.

The operational parameter may, for example, be the engine rpm or engine temperature.

Preferably, the method further comprises the step of correcting the ignition timing and the amount of injected fuel as a function of at least one characteristic temperature and one characteristic air pressure.

Preferably the method also comprises the step of controlling the end of the injection step according to the opening function of the inlet valve. A substantial portion of the fuel is preferably injected shortly before closing of the inlet valve.

In yet another embodiment of the present invention the method further comprises the steps of beginning the injection step before the inlet valve begins to open and ending the injection step during the open state of the inlet valve.

Preferably, the step further includes the step of correcting the amount of injected fuel according to a signal of an exhaust gas sensor.

Advantageously, the method further comprises the step of keeping the inlet valves closed during initial turning of the combustion engine during starting.

Preferably, after initial turning of the internal combustion engine, the opening function is adjusted such that due to high inflow velocities an air/fuel mixture is mechanically produced.

Preferably, after initial turning of the internal combustion engine, the opening function is adjusted to a maximum charge filling value at which first injection steps are carried out.

The opening function subsequent to the first injections and ignitions is controlled such that a predetermined idling rpm is reached.

In preferred embodiment of the present invention, a plurality of inlet valves are provided for each cylinder of the internal combustion engine, and the method further comprises the step of opening only one inlet valve for each cylinder during starting.

For a design where a plurality of inlet valves are provided for each cylinder of the internal combustion engine, the method may also further comprise the step of opening only one inlet valve for each cylinder during partial load.

Preferably, during warm-up of the combustion engine, the opening function of the inlet valve is retarded relative to the working stroke of the piston.

The opening function of the inlet valve is preferably advanced when the combustion engine is near idling rpm.

Advantageously, under load the opening function is set to approximately zero.

In anther embodiment of the present invention, the opening function is set such that a predetermined power output of the combustion engine is not surpassed.

The method may also operate such that the opening function is controlled such that a predetermined engine rpm is not surpassed.

Preferably, the idling rpm is maintained at a preset value by controlling the opening function.

Preferably, short-term load changes are preformed by changing the opening function.

Preferably, the opening function is reduced when slip of a driven wheel occurs.

In a further embodiment of the present invention, the method further comprises the steps of providing a device for compressing the charge conveyed to the inlet valve, measuring the pressure upstream of the inlet valve, and controlling the opening function depending on the measured pressure such that a filling is achieved that is identical to a desired filling input via a manually operated accelerator pedal.

Expediently, the method further comprises a step of controlling a throttle, positioned within a suction tube and/or an exhaust gas manifold, for influencing the remaining gas in the combustion chamber depending on the operational parameters of the combustion engine.

With the inventive method the opening function of the inlet valve is controlled not only as a function of the position of the accelerator pedal, but also additionally as a function of further operational parameters of the internal combustion engine. For example, the maximum opening function during full load position can be adjusted to the rpm of the internal combustion engine so that during lower rpm the inlet valve closes earlier than at higher rpm so that for constantly low, pollutant levels in the exhaust gas (low emissions), on the one hand, a high torque at low rpm and, on the other hand, a high power output can be achieved. The inventive method may use a broad spectrum of possible devices for its realization. For example, between the camshafts, the phase position of which determines the opening function of the inlet valve, a conventional coupling gear may be provided wherein the coupler is controlled via an electronic control device which receives as initial parameters the position of the accelerator pedal and the operational parameters of the engine. However, it is also possible to provide each of the camshafts with its own phase positioner which adjusts the respective phase relative to the crankshaft so that the opening and closing flanks of the inlet valves can be adjusted independent of one another. In a further embodiment, a phase adjustment device can act between the two camshafts and a further phase adjusting device can be provided that is driven by the crankshaft via one of the camshafts.

Surprisingly, it has be found that with the inventive method a separate measuring of the amount (volume, respectively, mass) of intake air flowing into the combustion engine is no longer required because the knowledge of the opening function of the inlet valve and of the engine rpm allows for exact determination of the amount of intake air flowing into the combustion engine. Dynamic corrections are thus hardly required. Thus, with the very simple method according to the present invention a very good operation of the combustion engine can be achieved.

When, according to a further embodiment of the present invention, the ignition timing and the amount of injected fuel are corrected as a function of at least one characteristic temperature and one characteristic air pressure, the precision of the control method is increased because the influence of the temperature and of the pressure onto the charge filling is additional taken into consideration. As the characteristic temperature, for example, it is possible to use the suction tube temperature. The characteristic pressure, since the inventively controlled combustion engine does not have a suction tube with a vacuum present therein, can be ambient pressure. Of course, for an even further improved precision the pressure within the suction tube directly upstream of the inlet valve can be measured which differs from the ambient air pressure due to flow losses and/or pressure pulsation.

When the end of the injection step is controlled according to the opening function of the inlet valve, the opening function of the inlet valve is preferably directly sensed by the position of the control member of the control device. Depending on the operational conditions, with the inventive method a plurality of degrees of freedom are present. For example, a great portion of the amount of fuel can be "prestored" directly after closing of the inlet valve because, especially during partial load due to the short opening duration of the inlet valve, a long time period for vaporization of the fuel due to heating is provided. Alternatively, during certain operational conditions fuel can be injected such that the high injection velocity can be used for mechanical fuel preparation and air/fuel mixture formation. For this purpose, the timing of the end of the injection step is especially important.

When a substantial portion of the fuel is injected shortly before closing of the inlet valve, an extremely effective mechanical air/fuel mixture preparation due to the high inflow velocity can be achieved, especially during partial load, where the timing of closure of the inlet valve is within the range of greatest piston velocity.

When the injection step is timed such that the beginning of the injection step is before the inlet valve begins to open and the end of the injection step is during the open state of the inlet valve, the fuel is thermally prepared by vaporization.

When the amount of injected fuel is corrected according to a signal of an exhaust gas sensor, it is possible to precisely maintain a desired lambda value.

When the method further comprises the step of keeping the inlet valves closed during initial turning of the combustion engine during starting, the internal combustion engine can be easily turned by the starter which relieves the current supply.

When after initial turning of the internal combustion engine the opening function is adjusted such that due to high inflow velocities an air/fuel mixture is mechanically produced, during the first working strokes of the internal combustion engine in which the cylinders are still cold and a thermal mixture preparation is hardly possible, the fuel/air mixture is thus prepared with kinetic inflow energy. A slight travel stroke in connection with opening of the inlet valve in the range of high piston velocity and/or high vacuum within the cylinder results in a greatest possible inflow velocity and thus in a very good mixture preparation.

The duration of opening of the inlet valve can be determined such that it closes in the range of highest piston velocity or shortly thereafter. The duration of opening can also be retarded in the range before bottom dead center of the piston. Then, due to the strong vacuum present, an especially powerful inflow is achieved. For the minimal turning rpm, despite the small travel stroke, a good filling is achieved which supports a powerful ignition.

When the opening function, subsequent to the first injections and ignitions, is controlled such that a predetermined idling rpm is reached, the highest possible charge filling and thus an effective compression is achieved. This is possible with the inventive control method because the closure flank of the inlet valve can be influenced as a function of rpm so that the inlet valve for low rpm closes for a maximum filling in the range of the bottom dead center and thus achieves an effective compression which corresponds to the geometric compression. This results in high compression end temperatures with correspondingly excellent combustion conditions.

When the opening function subsequent to the first injection and ignitions is controlled such that a predetermined idling rpm is reached, the engine controls, after start-up, automatically the desired idling speed.

For a plurality of inlet valves provided for each cylinder of the internal combustion engine, the step of opening only one inlet valve for each cylinder during starting is especially advantageous because the operation of only one inlet valve results in especially high inflow velocities of the charge which aids in the mixture preparation. Furthermore, for an asymmetric arrangement of the individual actuated valves relative to the combustion chamber turbulence of the charge results within the entire combustion chamber which is advantageous with respect to thermodynamic considerations.

When during warm-up of the combustion engine the opening function of the inlet valve is retarded relative to the working stroke of the piston, the mixture formation in the warm-up phase is improved when the inflow velocity of the new charge is increased.

When the opening function of the inlet valve is advanced when the combustion engine is near idling rpm, the sensitivity of the inventive method relative to mechanical tolerances within the engine is reduced.

Preferably, under load the opening function is set to approximately zero. This affords extremely soft transitions between breaking operation and load operation of the engine. Furthermore, it is achieved that the motor during braking operation does not cool down.

When the opening function is set such that a predetermined power output of the combustion engine is not surpassed, the combustion engine can be directly limited in its output by controlling the opening function.

When the opening function is controlled such that a predetermined engine rpm is not surpassed, the surpassing of the highest allowed rpm can be easily prevented by a simple control of the opening function.

When idling rpm is maintained at a preset value by controlling the opening function, the inventive method provides an extremely simple possibility for controlling the idle rpm without needing bypass systems etc.

The inventive method allows for fast control of the power output of the internal combustion engine by simply changing the opening function in order to control short-term load changes or slip of a driven wheel.

When the method further comprises the steps of providing a device for compressing the charge conveyed to the inlet valve, measuring the pressure upstream of the inlet valve, and controlling the opening function depending on the measured pressure such that a charge filling is achieved that is identical to the desired filling input by a manually operated accelerator pedal, the inventive method is extremely well suited for turbo-charged engines because the pressure, respectively, energy loss due to the conventional throttle valve is avoided.

When the method further comprises the step of controlling the throttle positioned within the suction tube and/or the exhaust gas manifold, for influencing the remaining gas in the combustion chamber depending on the operational parameters of the combustion engine, it is possible to achieve the lowest possible fuel consumption with the best possible emissions values.

With the inventive method an internal combustion engine, especially with an external ignition system, can be realized that has an extremely low fuel consumption with very low emissions within the exhaust gas. The inventive method provides especially for a directed influencing of the air-fuel mixture, the control times, and the remaining gas contents, for example, with valve overlap time cross-sections and/or with the pressure difference between the exhaust gas and the suction system, an operation with minimal consumption respectively, minimal emissions, whereby the emphasis on one or the other can be selected depending on the circumstances.

BRIEF DESCRIPTION OF THE DRAWING

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

Figure 1:
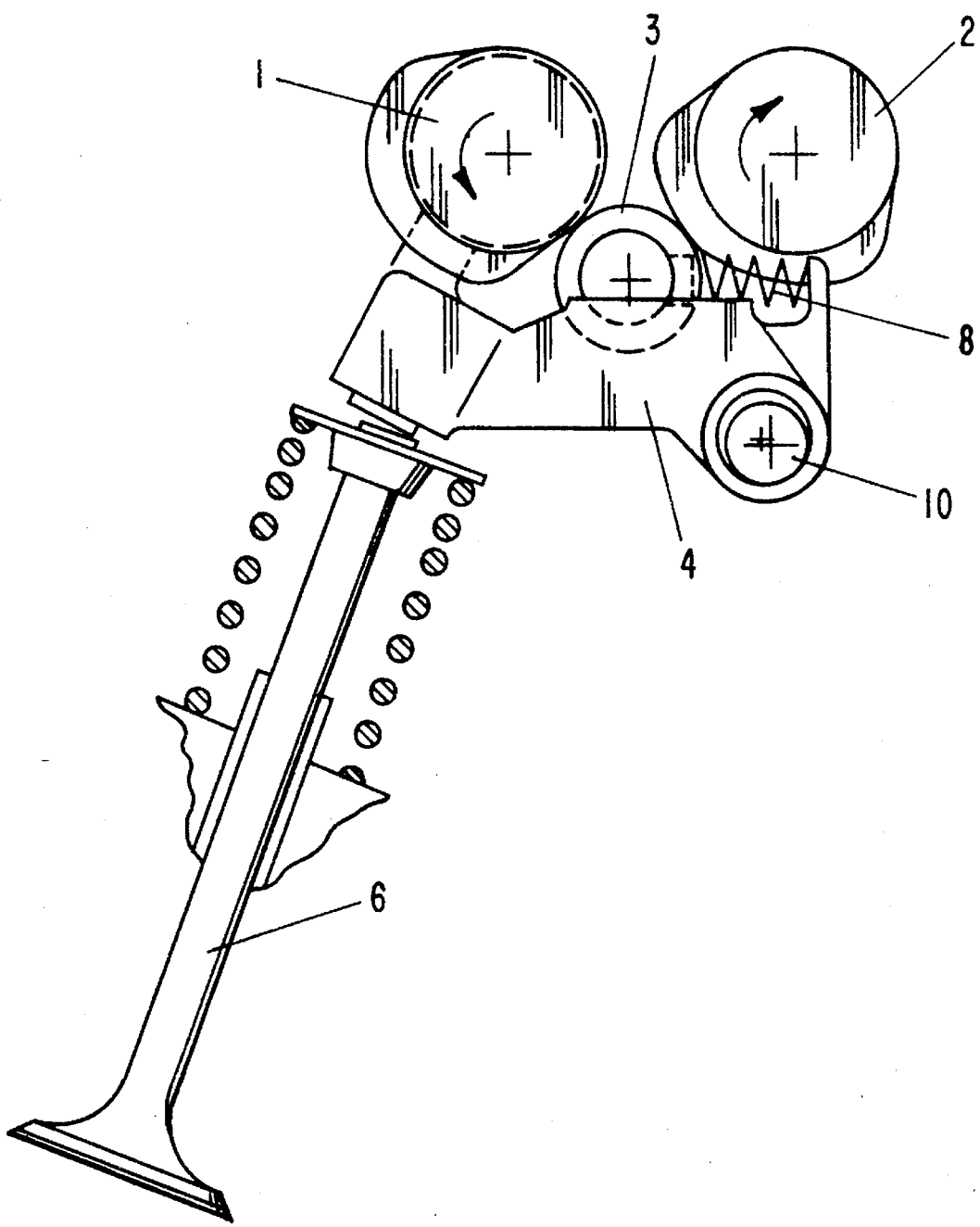
FIG. 1 shows a valve drive to be used for load control of an internal combustion engine having an external ignition system without throttle.

According to FIG. 1 the device for variable valve control of internal combustion engines comprises two camshafts 1 and 2 operated at identical rpm, whereby the cams act together on the transducer member 3. The overlap of the lifting function of the two cams results in the movement of the transducer member 3 which is transmitted with one or more transmission members 4 onto the valve 6, for example, an inlet valve. By changing the relative phase position of the two camshafts 1 and 2 relative to one another, this lifting movement can be varied with respect to the height of the maximum stroke as well as with respect to the duration of the valve opening within wide ranges.

The transducer member 3 is displaceably guided on the transmission member 4. The transmission member 4 is in the form of a follower lever. The spring 8 provides for a defined abutment of the transducer member 3 at the periphery of the cam shaft 1. At 10 the transmission member 4 is pivotably supported.

The function of the aforedescribed arrangement is as follows:

The camshafts 1 and 2 rotate, as indicated by the arrows, at identical velocity in opposite directions. Shaft 1 is the opening camshaft and shaft 2 is the closing camshaft, whereby the arrangement is sized such that the valve 6 is closed when the transducer member 3 contacts the cam portion of the closing camshaft 2 and the base circle of the opening camshaft 1 (represented state of FIG. 1).

When the opening camshaft 1 is further rotated from the illustrated position, the opening flank of the opening camshaft 1 comes into contact with the transducer member 3 which is still in contact with the cam portion of the closing camshaft 2. Thus, the valve 6 is opened and remains open until the cam portion of the closing camshaft 2 terminates and the base circle of the closing camshaft 2 comes into contact with the transducer member 3. Subsequently, the cam portion of the opening camshaft 1 terminates so that the transducer member 3 under the force of the spring 8 will move away from the camshaft 2 until the cam portion of the camshaft comes into contact with the transducer member 3 and the aforedescribed process is repeated.

Figure 2:
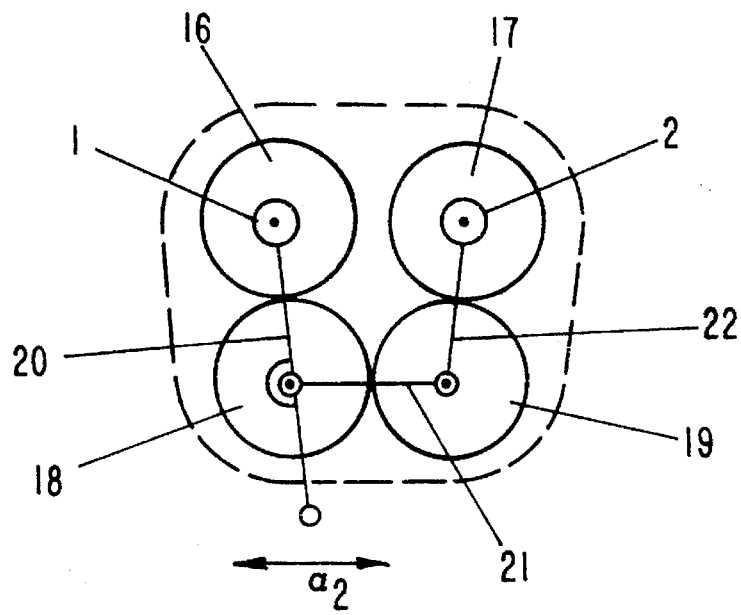
FIG. 2 a coupling gear which can be used for changing the relative phase position of the two camshafts according to FIG. 1.

The opening function of the valve 6 can be changed by changing the phase position between the camshafts 1 and 2. A device for changing this phase position is represented in FIG. 2

This device is comprised of the coupling gear with four gear wheels 16, 17, 18, and 19 which are coupled with connecting rods or couplers 20, 21, and 22. The gear wheel 16 is fixedly connected to the opening camshaft 1 which is, for example, directly driven by the crankshaft of the internal combustion engine. The gear wheel 17 is fixedly connected to the closing camshaft 2. The connecting rod (coupler) 20 extends outwardly, and can be pivoted relative to the opening cam shaft 1 (double arrow $\alpha_2$). The position $\alpha_2$ of the connecting rod 20 determines the phase position between the gear wheels 16 and 17 and thus between the opening camshaft 1 and the closing camshaft 2.

Figure 3:
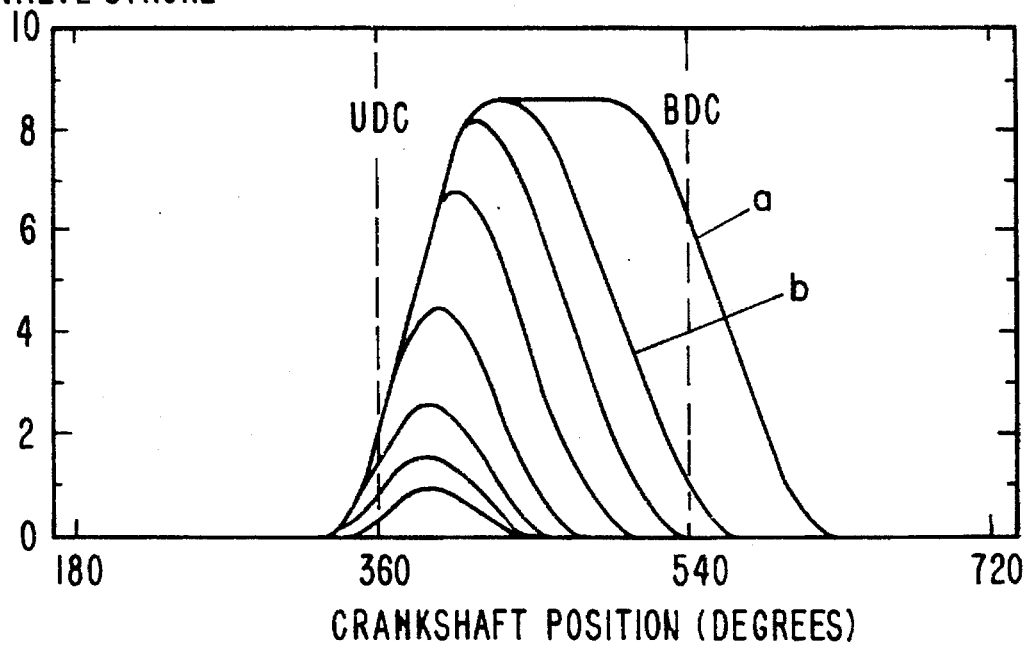
FIG. 3 a number of opening functions of the inlet valve according to FIG. 1.

With the described device the represented number of opening functions shown in FIG. 3 can be realized for the inlet valve 6 as a function of the phase position between opening camshaft 1 and closing camshaft 2. The Y axis represents the valve stroke, the X axis represents the position of the crankshaft in degrees whereby 360 degrees corresponds to the upper dead center (UDC) before the intake phase and 540 degrees corresponds to the bottom dead center (BDC) at the end of the intake phase of the respective cylinder. As can be seen in FIG. 3, in the disclosed embodiment the beginning of the opening of the valve remains substantially unchanged and, depending on the phase between the opening and closing camshafts, the stroke changes first with increase of the opening integral. Subsequently, stroke and closing timing of the inlet valve are changed, and, for greater opening integral finally, as soon as the maximum stroke has been reached, only the closing timing changes. With such a large number of opening functions the entire load range from idle to full load can be covered whereby even a stroke of zero is possible. Depending on the operational state of the internal combustion engine different opening functions for the same position of the accelerator pedal can be controlled. For example, the curve to the right of FIG. 3, indicated by reference numeral a, corresponds to full load at high rpm, while the curve indicated at b corresponds to full load at low rpm.

By mounting further phase displacement devices within the valve drive, further degrees of freedom can be reached. For example, the phase between the opening camshaft 1 and the crankshaft can be changed by providing a conventional phase displacer so that the entire curve diagram of FIG. 3 can be shifted to the left or to the right. It is also possible to provide separate coupling gears driven by the crankshafts for the opening camshaft 1 and the closing camshaft 2 so that further degrees of freedom are possible. Of course, the phase displacement devices are also suitable for controlling the outlet valve(s).

The valve drive represented in FIG. 1 can also be modified with respect to making it possible that for a plurality of inlet valves per cylinder all of them except one can be shut down. For this purpose a plurality of constructive designs are possible which are not represented here. For example, each one of the inlet valves can have coordinated therewith its own closing camshaft controlled via its own coupling gear whereby the phase of this closing camshaft is controlled such that the corresponding inlet valves under certain operational conditions, for example, during start-up or during low load conditions, can be completely closed. Alternatively, it is possible to provide a plurality of transducer members and/or transmission members per cylinder which cooperate with the inlet valves. Between the transmission members a coupling mechanism is provided with which individual transmission members are coupled, respectively, decoupled such that in the decoupled state only one inlet valve is actuated.

Figure 4:
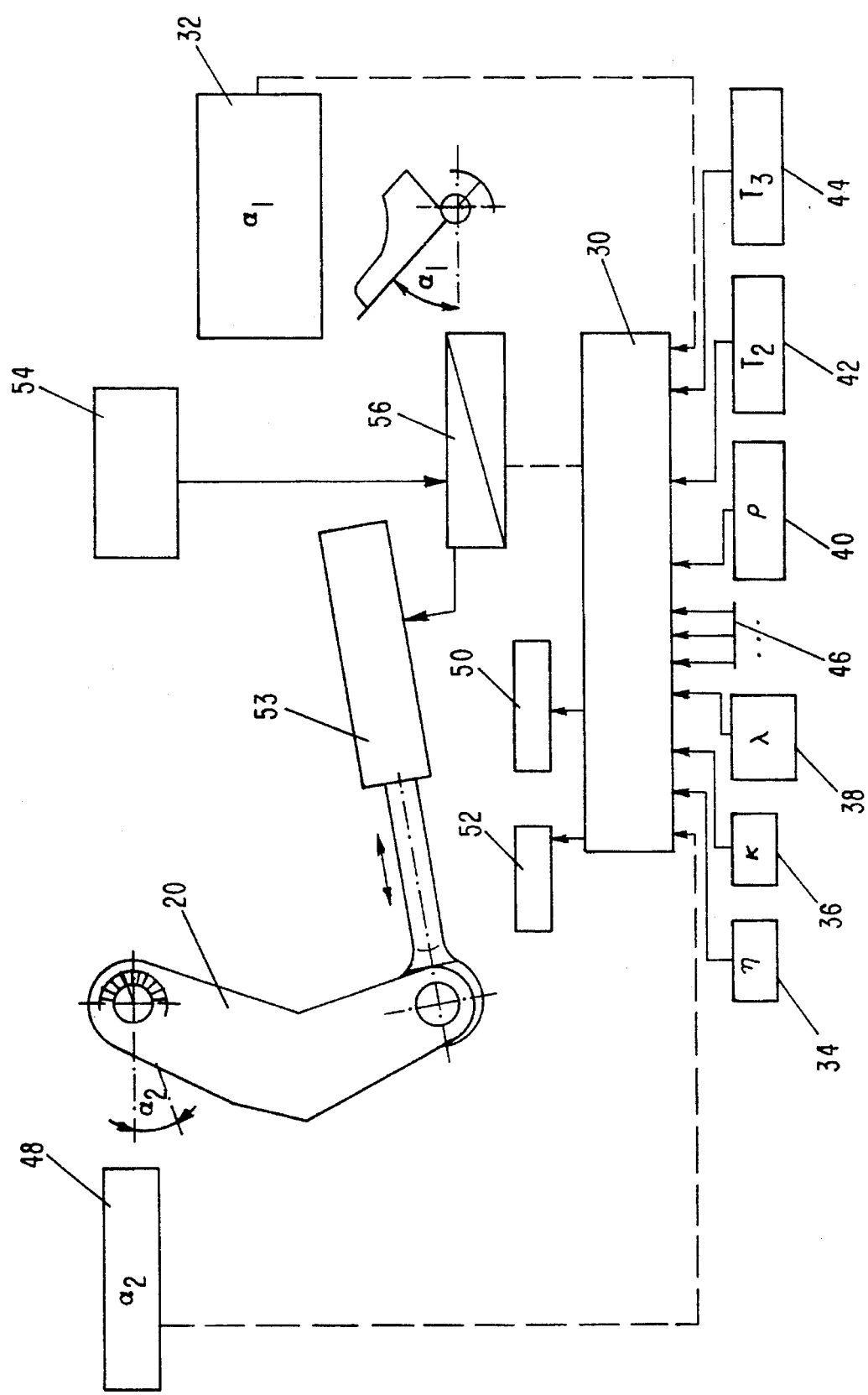
FIG. 4 a block diagram of a motor control device.

FIG. 4 shows the basic design of the control system for the disclosed internal combustion engine.

To a central control device 30 the following elements are connected: the sender of an electronic accelerator pedal 32, an rpm sensor 34 for the engine rpm, a knocking sensor 36, a lambda probe 38, a pressure sensor 44 generating a signal corresponding to the air pressure upstream of the inlet valve(s), preferably the ambient air pressure, a suction tube 42, a radiator sensor 44, optionally further sensors 46, for example, for the pressure directly upstream of the inlet valve or for the oil temperature, and a position indicator 48 that detects an angle $\alpha_2$ as the position of the coupler 20.

At its terminals, the control device 30 supplies signals for controlling the injection 50, the ignition 52, and the position of the actuating device 53 for actuating the coupler 20. The actuating device 53 can be, for example, hydraulically actuated whereby a hydraulic energy supply unit 54 is provided which controls the actuating device 53 via a control unit 56. Design and technology of the control device 30 is known per se and therefore will not be disclosed in detail here.

The control device 30 has stored therein, for example, performance characteristics in which as a function of the current rpm of the internal combustion engine and the position $\alpha_1$ of the coupler 20, optionally additionally a time differential of $\alpha_1$, values for controlling the control unit 56, the injection 50, and the ignition 52 are saved. This basic control is sufficient in order to precisely precontrol the internal combustion engine whereby no complicated correcting algorithms must be used, as is necessary for conventional controls of throttle-controlled internal combustion engines. The respective charge filling of the cylinders is precisely set due to the respectively activated opening function of the inlet valve, determined by the position $\alpha_2$ of the coupler 20.

Depending of the desire of the driver and/or the respective requirements, the correlation between the position $\alpha_1$ of the electronic accelerator pedal 32 and the corresponding position $\alpha_2$ of the coupler 20 can be influenced in the control device so that the engine can act fast to momentary movements of the accelerator pedal, so that a sporty feel results, or react damped, so that the comfort is increased.

The precontrol values determined by the performance characteristics are advantageously corrected by the temperature values detected by the pressure sensor 40 and one or more of the temperatures sensors 42 and 44. This ensures consideration of generally slowly changing additional parameters in regard to the charge filling.

The software provided in the control device 30 controls the end of the injection step advantageously as a function of the momentary opening function of the inlet valve. In an internal combustion engine without throttle their is no great vacuum-loaded dead volume within the suction tube in which the mixture preparation takes place. However, the inventive method has two advantages. On the one hand, during low load the opening for the inlet valve is relatively short so that a long time period for the thermal vaporization of fuel is provided when it is directly injected after closing of the inlet valve onto the hot valve. On the other hand, the closing flanks of the inlet valve during low load (lower curve of FIG. 3) in the range of greater piston velocity, so that extremely high inflow velocities are present which can be used for mechanically mixing fuel and air. Depending on the operational state of the engine, one or the other advantage can be employed or both advantages can be combined. When an additional displacer is provided, which allows to displace the low load curves of FIG. 3 so as to effect retardation, extremely high inflow velocities are provided for smallest opening functions, respectively, smallest loads which result in a good mechanical air/fuel mixture preparation.

Advantageously, the injected amount of fuel is controlled as a function of the signal of the lambda probe 38 or any other probe within the exhaust gas manifold for analyzing the exhaust gas so that a predetermined exhaust gas composition is achieved. Advantageously, the injection and/or ignition is controlled when knocking signals occur until the knocking disappears.

Figure 5:
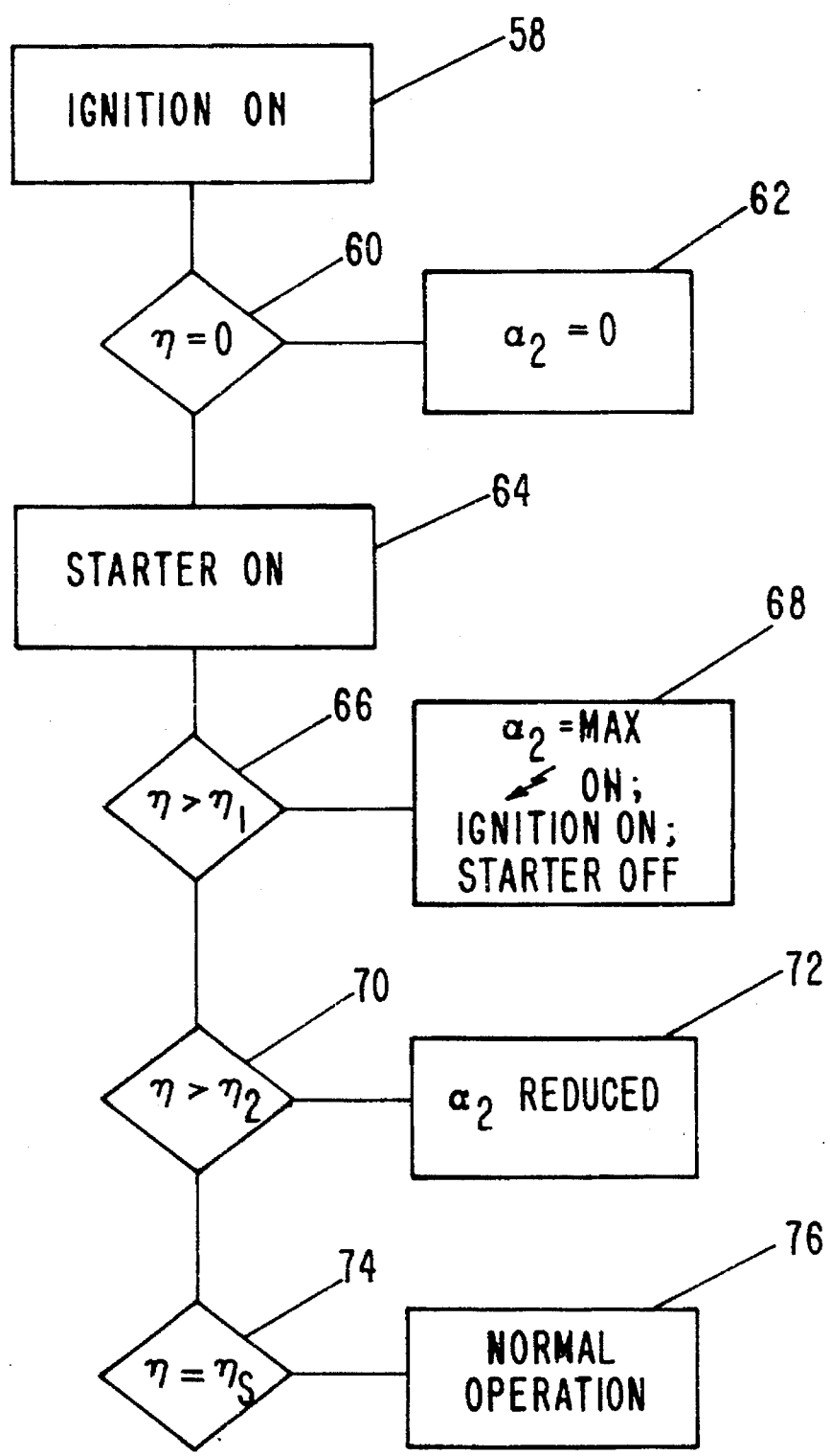
FIG. 5 a flow chart of a starting operation.

With respect to start-up, the load control without throttle provides advantageous possibilities which will be described in detail with the aid of FIG. 5. In a first step 58 the ignition is switched on. When in step 60 it is determined that the rpm is zero the coupler 20 is adjusted in step 62 to the value $\alpha_2=0$ so that the inlet valve is substantially closed. The engine can be easily turned in step 64 which relieves the current supply. When in step 66 it is determined that the rpm surpasses a value $n_1$, the coupler 20 is positioned to $\alpha_2$=max in step 68, i.e., maximum charge filling (charge input) at the current rpm is achieved. It is understood that this value does not correspond to the maximum possible opening integral, respectively, the maximum possible opening function which is the envelope curve of FIG. 3 for high rpm. Subsequently, the ignition is switched on, fuel is injected, and the starter is turned off. As soon as the internal combustion engine reaches high rpm and it is determined in step 70 that the rpm surpasses the preset rpm $n_2$, the value $\alpha_2$ in step 72 is constantly reduced until in step 74 it is determined that the desired (nominal) rpm $n_s$ has been reached so that subsequently in step 76 normal operation is assumed.

With this start-up procedure the internal combustion engine is started at any time safely with minimum current consumption and optimum exhaust gas quality.

Advantageously, the control device 30 controls the operation such that during the warm-up phase of the internal combustion engine the opening function of the inlet valve is retarded when a corresponding phase adjusting device is present. This achieves that the new charge during the suction stroke of the piston flows in with increased flow velocity which improves the mechanical mixing for the cold engine.

As an alternative to the described start-up procedure, the valve drive can be adjusted in step 66 such that the opening function is realized that has a short stroke and with which opening initiation occurs at approximately 450 degree of crank shaft rotation and closing takes places in the area of the bottom dead center. This results in a good charge filling (charge input) with excellent mechanical mixture preparation.

During operation of the engine near idling speed, the opening function of the inlet valve is advantageously advanced so that an increased rpm stabilization is achieved because the sensitivity with regard to mechanical tolerances of the engine is reduced due to the lack of a pressure difference.

Under braking conditions, i.e., for $\alpha_1=0$ and an engine rpm greater than the idle rpm, the opening function is advantageously at least approximately brought to zero, i.e., $\alpha_2$ is positioned at approximately zero. This prevents a cooling of the engine, and soft transitions are achieved. It is understood that the braking operation can be determined in various ways, for example, with a torque sensor at the drive train.

The power output and rpm of the internal combustion engine can be limited in a simple manner via the opening function, respectively, the position of the coupler 20. Thus, it is possible to provide engines of different output by simply changing the software within the control device 30.

The inventive method operates so fast that short-term load changes, for example, during the switching of an automatic transmission which can be detected with an additional sensor 46, can be carried out by simply changing the opening function, i.e., adjusting $\alpha_2$ in order to smooth switching pulses.

It is also possible to avoid in this manner suddenly occurring slip of a driven drive wheel.

The inventive method can also be used when a turbo charger or other charging devices are to be used in connection with the internal combustion engine whereby upstream of the inlet valve a further sensor is installed which determines the pressure present thereat and which changes the correlation between $\alpha_1$ and $\alpha_2$ as a function of the pressure such that a predetermined correlation between the position of the accelerator pedal $\alpha_1$ and the desired torque, respectively, desired output is possible.

The inventive method is also suitable for use with internal combustion engines with different injection devices, such as central injection, individual cylinder injection and/or direct injection into the cylinder. Due to the mechanical mixture preparation which can be used in a directed manner with high inflow velocities combustion conditions can be optimized over a wide range of operating conditions.

With the inventive control device the pressure difference at the inlet valve is usable as an additional free parameter for controlling the remaining gas contents of the charge within the combustion chamber due to the lack of throttle at the inlet side. This pressure difference can be controlled with a throttle flap (not represented in the drawings) within the suction system and/or in the exhaust gas system of the internal combustion engine which is connected to and controlled by a control motor with the control device 30. For controlling the remaining gas contents to values of 25 to 30%, pressure differences of less than 0.05 bar are sufficient.

The following remaining gas contents have, for example, proven advantageous;

near idling range: remaining gas contents of 15 to 18% for smooth running and low HC emissions;

in the range of medium load: remaining gas contents between 20 to 30% for low $NO_x$ emission and favorable fuel consumption;

in the range of high loads: low remaining gas contents between 4 to 8% for high charge filing, low compression end temperature, and low knocking tendency.

Figure 6:
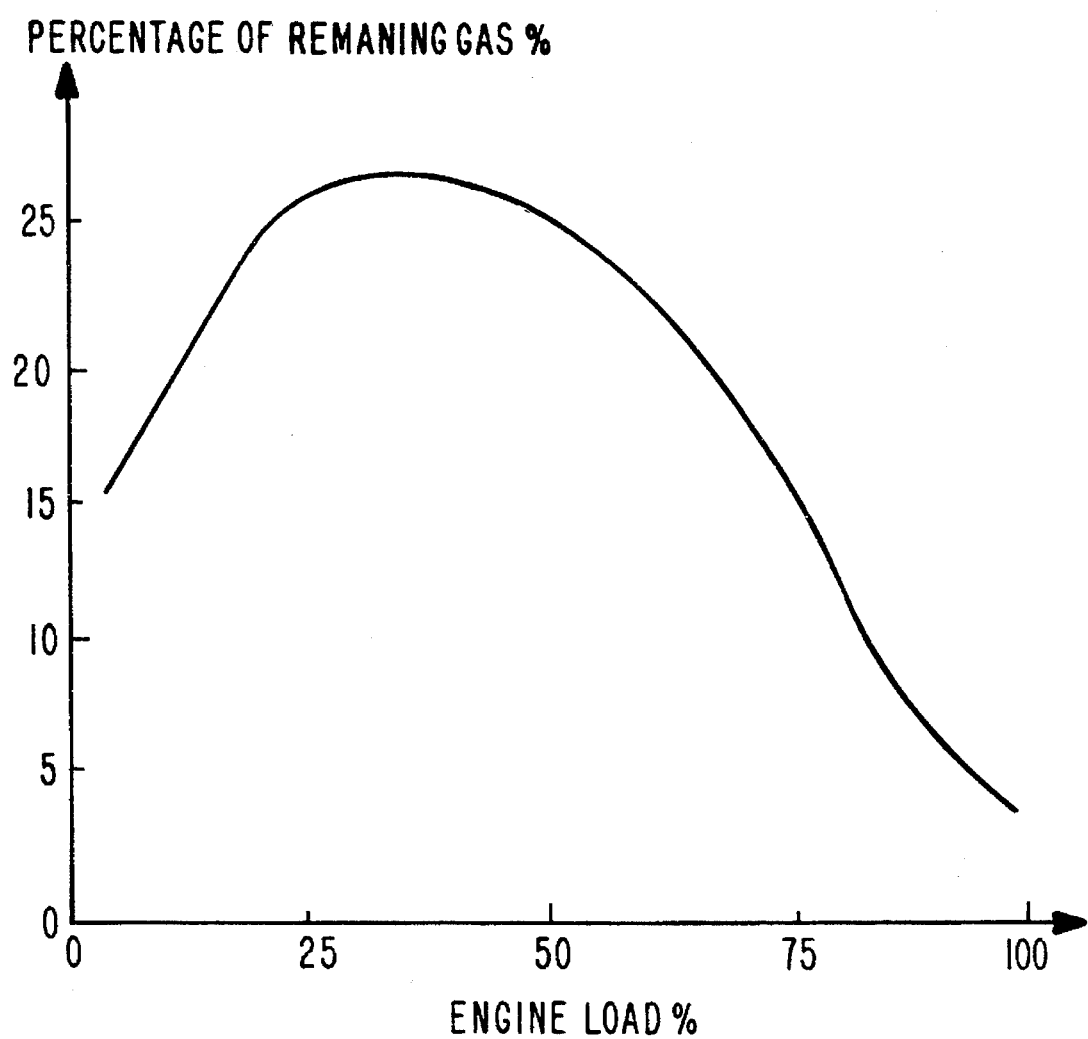
FIG. 6 an example of the course of the proportion of remaining gas as a function of load.

FIG. 6 shows an example for a favorable remaining gas contents as a function of load.

The present invention is, of course, in no way restricted to the specific disclosure of the specification and drawings, but also encompasses any modifications within the scope of the appended claims.

What we claim is:

1. A method for controlling power output of an internal combustion engine with an external ignition system; said method comprising the steps of:

providing at least one inlet valve for each cylinder of the internal combustion engine for determining the charge input of a combustion chamber during an intake stroke of the internal combustion engine;

providing a fuel injection system for injecting, in an injection step, fuel into the combustion chamber;

setting with a control device a relative phase position between a first and a second cam shaft operating at identical rpm for determining an opening function of the inlet valve, the opening function being defined by the stroke and duration of an open state of the inlet valve;

adjusting a position of the control device according to an accelerator pedal position and at least one operational parameter of the combustion engine; and controlling at least one of the ignition timing and the amount of injected fuel directly according to the position of the control device and the rpm of the internal combustion engine.

2. A method according to claim 1, further comprising the step of correcting the ignition timing and the amount of injected fuel as a function of at least one characteristic temperature and one characteristic air pressure.

3. A method according to claim 1, further comprising the step of controlling the end of the injection step according to the opening function of the inlet valve.

4. A method according to claim 3, wherein a substantial portion of the fuel is injected shortly before closing of the inlet valve.

5. A method according to claim 1, further comprising the steps beginning the injection step before the inlet valve begins to open and ending the injection step during the open state of the inlet valve.

6. A method according to claim 1, further including the step of correcting the amount of injected fuel according to a signal of an exhaust gas sensor.

7. A method according to claim 1, further comprising the step of keeping the inlet valves closed during initial turning of the combustion engine during starting.

8. A method according to claim 7, further comprising, after initial turning of the internal combustion engine, the step of adjusting the opening function such that due to high inflow velocities an air/fuel mixture is mechanically produced.

9. A method according to claim 7, further comprising, after initial turning of the internal combustion engine, the step of adjusting the opening function to a maximum charge filling value for carrying out the first injection steps.

10. A method according to claim 9, wherein the opening function subsequent to the first injections and ignitions is controlled such that a predetermined idling rpm is reached.

11. A method according to claim 1, wherein a plurality of inlet valves are provided for each cylinder of the internal combustion engine, further comprising the step of opening only one inlet valve for each cylinder during starting.

12. A method according to claim 1, wherein a plurality of inlet valves are provided for each cylinder of the internal combustion engine, further comprising the step of opening only one inlet valve for each cylinder during partial load.

13. A method according to claim 1, wherein during warm-up of the combustion engine the opening function of the inlet valve is retarded relative to the working stroke of the piston.

14. A method according to claim 1, wherein the opening function of the inlet valve is advanced when the combustion engine is near idling rpm.

15. A method according to claim 1, wherein under load the opening function is set to approximately zero.

16. A method according to claim 1, wherein the opening function is set such that a predetermined power output of the combustion engine is not surpassed.

17. A method according to claim 1, wherein the opening function is controlled such that a predetermined engine rpm is not surpassed.

18. A method according to claim 1, wherein the idling rpm is maintained at a preset value by controlling the opening function.

19. A method according to claim 1, wherein short-term load changes are performed by changing the opening function.

20. A method according to claim 1, wherein the opening function is reduced when slip of a driven wheel occurs.

21. A method according to claim 1, further comprising the steps of providing a device for compressing the load conveyed to the inlet valve, measuring the pressure upstream of the inlet valve, and controlling the opening function depending on the measured pressure such that a filling is achieved that is identical to a desired filling introduced via a manually operated accelerator pedal.

22. A method according to claim 1, further comprising the step of controlling a throttle, positioned within a suction tube, for affecting the remaining gas in the combustion chamber depending on the operational parameters of the combustion engine.

23. A method according to claim 1, further comprising the step of controlling a throttle, positioned within an exhaust gas manifold, for influencing the remaining gas in the combustion chamber depending on the operational parameters of the combustion engine.

24. A method according to claim 1, wherein said at least one operational parameter is selected from the group consisting of engine rpm and engine temperature.

* * * * *